(12) United States Patent
Shen

(10) Patent No.: US 9,163,679 B1
(45) Date of Patent: Oct. 20, 2015

(54) MAGNETIC POWDER BRAKE DEVICE OF MOTOR USED FOR OIL PRODUCTION

(71) Applicant: Yen-Hong Wong, New Taipei (TW)

(72) Inventor: Kuei-Hsien Shen, New Taipei (TW)

(73) Assignee: Yen-Hong Wong, New Taipei (TW)

( * ) Notice: Subject to any disclaimer, the term of this patent is extended or adjusted under 35 U.S.C. 154(b) by 0 days.

(21) Appl. No.: 14/306,399

(22) Filed: Jun. 17, 2014

(51) Int. Cl.
*F16D 57/00* (2006.01)
*E21B 43/12* (2006.01)

(52) U.S. Cl.
CPC ............. *F16D 57/002* (2013.01); *E21B 43/126* (2013.01)

(58) Field of Classification Search
CPC .................................. F16D 57/002; F01C 1/01
See application file for complete search history.

(56) References Cited

U.S. PATENT DOCUMENTS

| | | | | |
|---|---|---|---|---|
| 3,263,619 | A * | 8/1966 | Matelena | 417/356 |
| 8,491,278 | B2 * | 7/2013 | Mello et al. | 417/390 |
| 8,550,218 | B2 * | 10/2013 | Villa et al. | 188/158 |

* cited by examiner

*Primary Examiner* — Bradley King
(74) *Attorney, Agent, or Firm* — Rosenberg, Klein & Lee

(57) ABSTRACT

A magnetic powder brake device of a motor used for oil production is provided. The motor has a turning shaft and an oil extraction pump, and is coupled with a magnetic powder brake. The magnetic powder brake is connected with an electromagnetic switch and a battery. The electromagnetic switch is provided with a power sensor and connected with a power source. When the motor is turned under a normal power supply, the electromagnetic switch is in a disconnection state and the battery doesn't supply power to the magnetic powder brake, so the turning shaft is not braked by the magnetic powder brake. In case of an unexpected power failure, the electromagnetic switch is in a connection state, the battery supplies power to the magnetic powder brake, and the magnetic powder brake is activated to brake the turning shaft, preventing the turning shaft from turning reversely.

1 Claim, 2 Drawing Sheets

MAGNETIC POWDER BRAKE DEVICE OF MOTOR USED FOR OIL PRODUCTION

BACKGROUND OF THE INVENTION

1. Field of the Invention

The present invention relates to a magnetic powder brake device of a motor used for oil production, and more particularly to a motor having a magnetic powder brake device to prevent a turning shaft of the motor from turning reversely in case of an expected power failure.

2. Description of the Prior Art

A conventional spiral rod motor used for oil production has a long hollow turning shaft and an oil extraction pump to extend into an oil field underground. The turning shaft and the spiral oil extraction pump are turned to extract the petroleum underground. The conventional spiral rod motor doesn't have a brake device. Hence, in case of a power failure, the turning shaft and the oil extraction pump which are very long (about thousands of meters) will generate a counterforce when they are stopped turning, which causes a reverse turning of the turning shaft and the oil extraction pump. The reverse tuning will cause the petroleum to flow reversely and the parts of the equipment to turn reversely and to cause damages accordingly. To prevent the reverse turning in case of a power failure, it is necessary to provide an apparatus to prevent the petroleum from flowing backward, namely, the conventional motor used for oil production doesn't have a brake device itself. Thus, the conventional motor is unable to brake the turning shaft and the oil extraction pump instantaneously in case of a power failure to result in a reverse turning. Accordingly, the inventor of the present invention has devoted himself based on his many years of practical experiences to solve these problems.

SUMMARY OF THE INVENTION

The primary object of the present invention is to improve the problem of the prior art and to provide a magnetic powder brake device of a motor used for oil production. The motor has a turning shaft and an oil extraction pump, and is coupled with a magnetic powder brake. The magnetic powder brake corresponds to the turning shaft of the motor. The magnetic powder brake is connected with an electromagnetic switch and a battery. The electromagnetic switch is provided with a power sensor. The power sensor is connected with a power source. When the motor is turned under a normal power supply, the electromagnetic switch is in a disconnection state and the battery doesn't supply power to the magnetic powder brake, so the turning shaft is in a free state, not braked by the magnetic powder brake. In case of an unexpected power failure, the power sensor makes the electromagnetic switch be in a connection state, the battery supplies power to the magnetic powder brake, and the magnetic powder brake is activated to brake the turning shaft, preventing the turning shaft from turning reversely.

DETAILED DESCRIPTION OF THE PREFERRED EMBODIMENTS

Embodiments of the present invention will now be described, by way of example only, with reference to the accompanying drawings.

Figure 1:
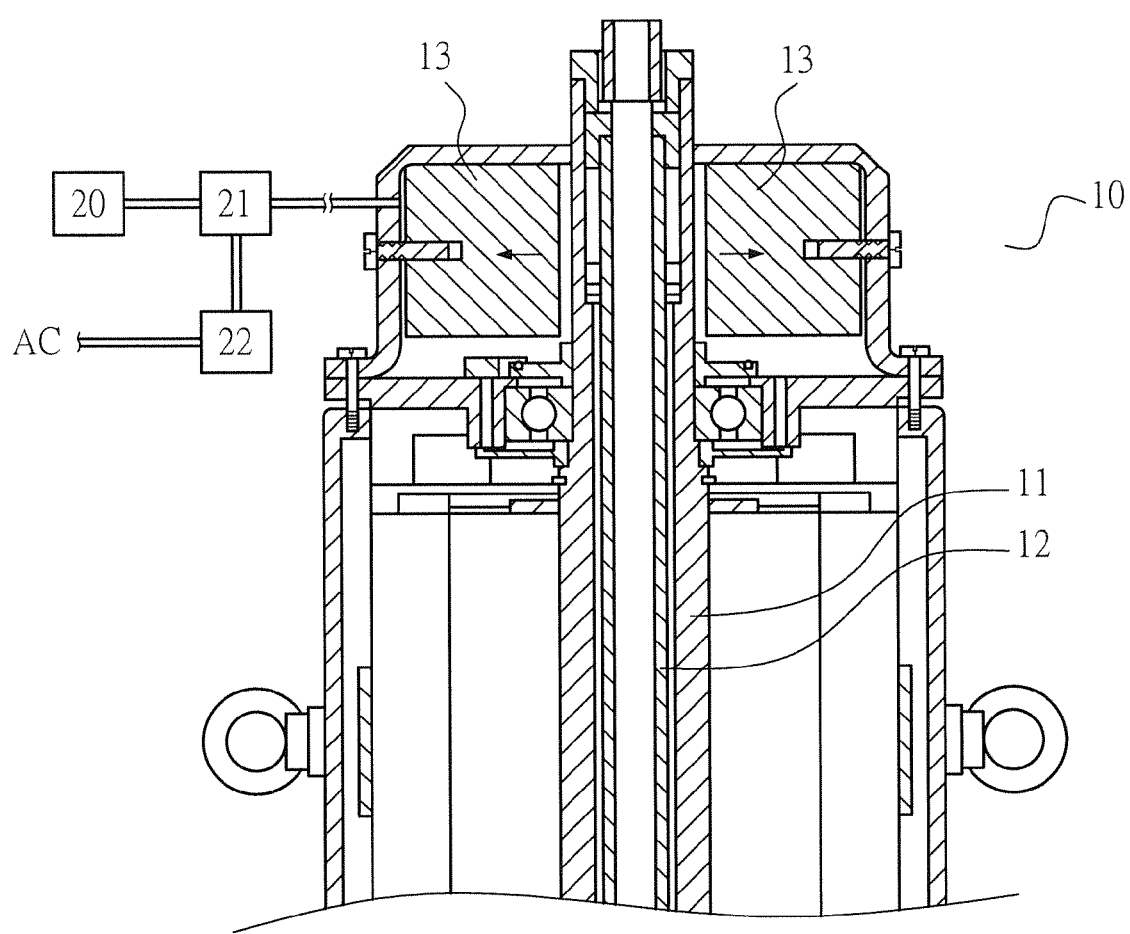
FIG. 1 is a sectional view the present invention.
Figure 2:
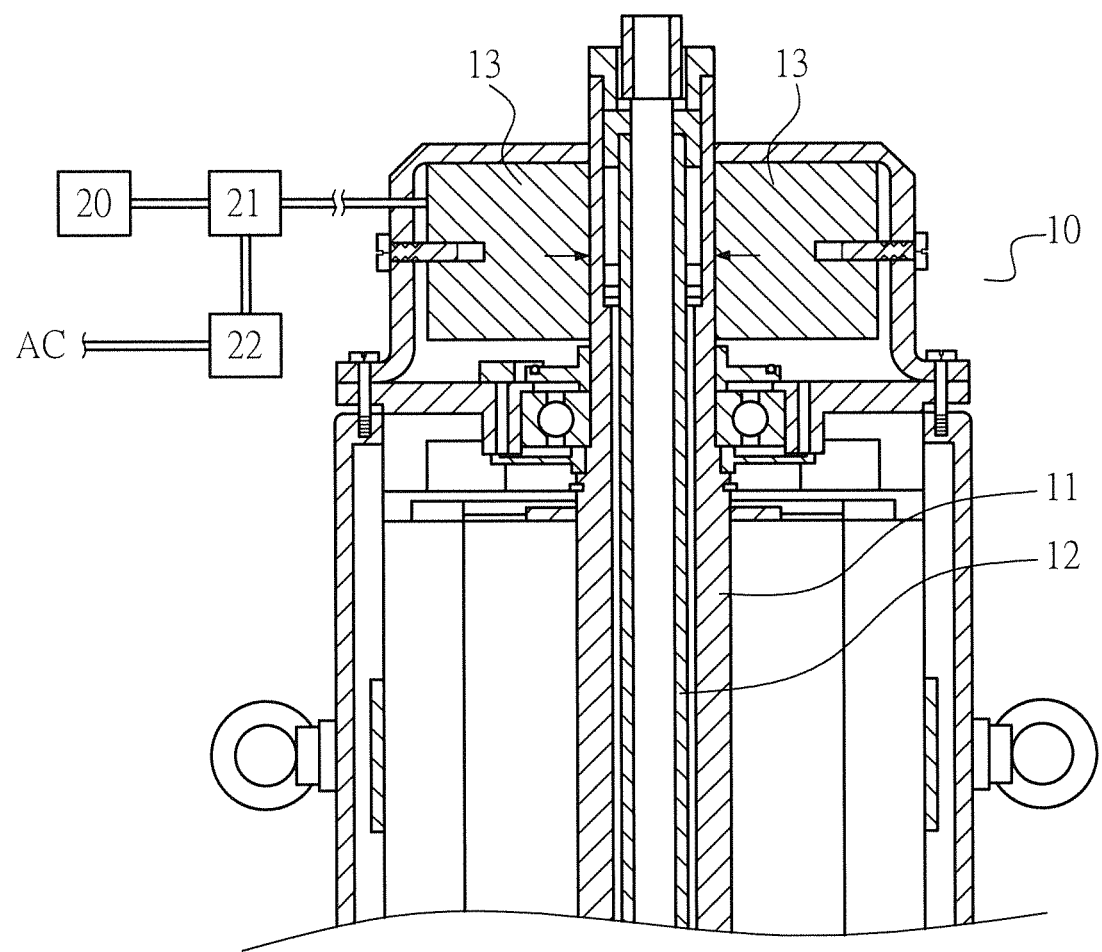
FIG. 2 is a sectional view the present invention in a brake state.

Referring to FIG. 1, a motor 10 has a turning shaft 11 and an oil extraction pump 12 which are integrally linked. The motor 10 is coupled with a magnetic powder brake 13. The magnetic powder brake 13 corresponds to the turning shaft 11, and is provided with a battery 20 connected to the magnetic powder brake 13. An electromagnetic switch 21 is provided between the battery 20 and the magnetic powder brake 13. The electromagnetic switch 21 is provided with a power sensor 22. The power sensor 22 is connected with a power source AC.

According to the aforesaid device, the function and effect of the present invention are described hereinafter. As shown in FIG. 1, when the motor 10 is turned under the normal power supply, the power sensor 22 makes the electromagnetic switch 21 be in OFF state. The battery 20 doesn't supply power to the magnetic powder brake 13. Thus, the turning shaft 11 is in a free state, not braked. In case of an unexpected power failure (the power source AC is cut off), the power sensor 22 can detect that there is no power and make the electromagnetic switch 21 be in ON state. The battery 20 supplies power to the magnetic powder brake 13. The magnetic powder brake 13 is activated to brake the turning shaft 11. This can prevent the turning shaft 11 from turning reversely in case of an unexpected power failure. The aforesaid brake response will be instantaneous as soon as an unexpected power failure happens, providing a quick brake function.

As the foregoing, the magnetic powder brake of the present invention is integrated with the motor to reduce the size, and can brake quickly to prevent a reverse turning.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A magnetic powder brake device of a motor used for oil production, the motor having a turning shaft and an oil extraction pump which are integrally linked, the motor being coupled with a magnetic powder brake, the magnetic powder brake corresponding to the turning shaft and being provided with a battery connected to the magnetic powder brake, an electromagnetic switch being provided between the battery and the magnetic powder brake, the electromagnetic switch being provided with a power sensor, the power sensor being connected with a power source; wherein when the motor is turned under a normal power supply, the power sensor makes the electromagnetic switch be in a disconnection state, the battery doesn't supply power to the magnetic powder brake, and the turning shaft is in a free state, not braked by the magnetic powder brake; wherein in case of an unexpected power failure, the power sensor makes the electromagnetic switch be in a connection state, the battery supplies power to the magnetic powder brake, and the magnetic powder brake is activated to brake the turning shaft, preventing the turning shaft from turning reversely.

* * * * *